United States Patent
Varatharajan et al.

(10) Patent No.: US 7,802,434 B2
(45) Date of Patent: Sep. 28, 2010

(54) SYSTEMS AND PROCESSES FOR REDUCING $NO_x$ EMISSIONS

(75) Inventors: Balachandar Varatharajan, Clifton Park, NY (US); Chellappa Balan, Niskayuna, NY (US); Andrei Tristan Evulet, Clifton Park, NY (US); Ravi Kumar Vipperla, Irvine, CA (US)

(73) Assignee: General Electric Company, Niskayuna, NY (US)

( * ) Notice: Subject to any disclaimer, the term of this patent is extended or adjusted under 35 U.S.C. 154(b) by 924 days.

(21) Appl. No.: 11/641,643

(22) Filed: Dec. 18, 2006

(65) Prior Publication Data

US 2008/0141643 A1    Jun. 19, 2008

(51) Int. Cl.
   *F02C 6/18* (2006.01)
(52) U.S. Cl. .............. 60/780; 60/39.464
(58) Field of Classification Search .......... 60/780, 60/39.12, 39.5, 39.511, 39.52, 39.464
   See application file for complete search history.

(56) References Cited

U.S. PATENT DOCUMENTS

| | | | |
|---|---|---|---|
| 3,982,962 A | 9/1976 | Bloomfield | |
| 3,986,349 A | 10/1976 | Egan | |
| 4,308,128 A | 12/1981 | Cummings | |
| 4,622,275 A | 11/1986 | Noguchi et al. | |
| 5,343,691 A | 9/1994 | Coffinberry | |
| 5,417,051 A | 5/1995 | Ankersmit et al. | |
| 5,595,059 A * | 1/1997 | Huber et al. | 60/780 |
| 5,705,916 A * | 1/1998 | Rudbeck et al. | 60/774 |
| 5,740,667 A | 4/1998 | Bhattacharyya et al. | 60/783 |
| 5,832,718 A | 11/1998 | Suttrop | |
| 6,025,403 A | 2/2000 | Marier et al. | |
| 6,324,827 B1 | 12/2001 | Basu et al. | 60/780 |
| 6,348,278 B1 | 2/2002 | LaPierre et al. | |
| 6,530,223 B1 | 3/2003 | Dodds et al. | 60/746 |
| 6,976,362 B2 * | 12/2005 | Sheppard et al. | 60/780 |
| 6,989,135 B2 * | 1/2006 | Kennedy | 422/198 |
| 7,150,143 B2 * | 12/2006 | Schick et al. | 60/39.38 |
| 7,266,940 B2 * | 9/2007 | Balan et al. | 60/39.181 |
| 7,380,749 B2 * | 6/2008 | Fucke et al. | 244/58 |
| 2001/0047040 A1 | 11/2001 | Agee et al. | |
| 2001/0051662 A1 | 12/2001 | Arcuri et al. | 518/704 |
| 2003/0170518 A1 | 9/2003 | Clawson et al. | |
| 2003/0215762 A1 | 11/2003 | Retallick | |
| 2004/0031388 A1 | 2/2004 | Hsu | |
| 2004/0191591 A1 | 9/2004 | Yamamoto | |

(Continued)

FOREIGN PATENT DOCUMENTS

EP    0356906 B1    6/1993

(Continued)

OTHER PUBLICATIONS

EP Search Report, EP05251813, Jul. 19, 2005.

(Continued)

*Primary Examiner*—William H Rodríguez
(74) *Attorney, Agent, or Firm*—Francis T. Coppa

(57) ABSTRACT

A system for reducing NOx emissions, includes a reformer configured to receive a fuel and produce a hydrogen-enriched stream, a combustion system configured to burn the hydrogen enriched-stream and produce electricity and an exhaust stream, and a recuperator configured to recover heat from the exhaust stream, wherein the recovered heat is recycled back to the reformer.

18 Claims, 4 Drawing Sheets

U.S. PATENT DOCUMENTS

| | | |
|---|---|---|
| 2005/0144961 A1 | 7/2005 | Colibaba-Evulet et al. .... 60/780 |
| 2005/0210881 A1 | 9/2005 | Balan et al. .................... 60/780 |
| 2005/0217276 A1 | 10/2005 | Colibaba-Evulet et al. .... 60/776 |
| 2005/0226809 A1 | 10/2005 | Balan et al. ................. 423/651 |
| 2008/0066470 A1* | 3/2008 | MacKnight .................. 60/780 |

FOREIGN PATENT DOCUMENTS

| | | |
|---|---|---|
| WO | 9941188 A1 | 8/1999 |
| WO | 0202460 A2 | 1/2002 |
| WO | 02078109 A1 | 10/2002 |

OTHER PUBLICATIONS

B. Chellappa et al., "System and Method for Co-Production of Hydrogen and Electrical Energy," U.S. Appl. 10/810,471, filed Mar. 20, 2004.

* cited by examiner

SYSTEMS AND PROCESSES FOR REDUCING NO$_x$ EMISSIONS

BACKGROUND

This disclosure relates to a system for reducing emissions in a power generation system, which utilizes hydrogen enriched fuel gas for emissions abatement in a gas turbine exhaust.

Air pollution concerns worldwide have led to stricter emissions standards. These standards regulate the emission of oxides of nitrogen, unburned hydrocarbons (UHC), and carbon monoxide (CO) generated as a result of gas turbine engine operation. In particular, nitrogen oxide is formed within a gas turbine engine as a result of the high combustor flame temperatures during operation.

The use of hydrocarbon fuels in a combustor of a fired turbine is well known. Generally, air and fuel are fed to a combustion chamber where the fuel is burned in the presence of the air to produce hot flue gas. The hot flue gas is then fed to a turbine where it cools and expands to produce power. By-products of the fuel combustion typically include environmentally harmful toxins, such as nitrogen oxide and nitrogen dioxide (collectively called NO$_x$), CO, UHC (e.g., methane and volatile organic compounds that contribute to the formation of atmospheric ozone), and other oxides, including oxides of sulfur (e.g., SO$_2$ and SO$_3$).

There are two sources of NO$_x$ emissions in the combustion of a fuel. The fixation of atmospheric nitrogen in the flame of the combustor (known as thermal NO$_x$) is the primary source of NO$_x$. The conversion of nitrogen found in the fuel (known as fuel-bound nitrogen) is a secondary source of NO$_x$ emissions. The amount of NO$_x$ generated from fuel-bound nitrogen can be controlled through appropriate selection of the fuel composition, and post-combustion flue gas treatment. As with all cyclic heat engines, higher combustion temperature means greater efficiency. However, a problem caused by the higher combustion temperatures is the amount of thermal NO$_x$ generated. Thermal generated NO$_x$ is an exponential function of the combustor flame temperature and the amount of time that the fuel mixture is at the flame temperature. Each air-fuel mixture has a characteristic flame temperature that is a function of the air-to-fuel ratio (expressed as the equivalence ratio, $\phi$) of the air-fuel mixture burned in the combustor. Thus, the amount of thermal NO$_x$ generated is based on the residence time, pressure, and the equivalence ratio of a particular air-fuel mixture. The equivalence ratio ($\phi$) is defined by the following ratio: $\phi=(mf/mo)actual/(mf/mo)stoichiometric$, where "mo" is the mass of the oxidizer and "mf" is the mass of the fuel.

The rate of NO$_x$ production is highest at an equivalence ratio of 1.0, when the flame temperature is equal to the stoichiometric, adiabatic flame temperature. At stoichiometric conditions, the fuel and oxygen are fully consumed. Generally, the rate of NO$_x$ generation decreases as the equivalence ratio decreases (i.e., is less than 1.0 and the air-fuel mixture is fuel lean). At equivalence ratios less than 1.0, more air and therefore, more oxygen is available than required for stoichiometric combustion. This results in a lower flame temperature, which in turn reduces the amount of NO$_x$ generated. However, as the equivalence ratio decreases, the air-fuel mixture becomes very fuel-lean and the flame will not burn well, or may become unstable and blow out. When the equivalence ratio exceeds 1.0, there is an amount of fuel in excess of that which can be burned by the available oxygen (fuel-rich mixture). This also results in a flame temperature lower than the adiabatic flame temperature, and in turn leads to significant reduction in NO$_x$ formation, however fuel is wasted making such a system costly and inefficient.

Prior art power generation systems use hydrogen enriched streams in the gas turbines to reduce NO$_x$ generation through reduced flame temperatures and increased operability. Hydrogen generation can be costly, however, and these power generation systems sometimes operate at less than optimal efficiencies. What is needed is a method for reducing NO$_x$ emissions in power generation systems through the use of a hydrogen enriched stream, while lowering the cost of production of both the power and the hydrogen, thereby leading to improved gains in system efficiency and operability.

Accordingly there remains a need for an improved power generation system using hydrogen rich fuel gases that can abate gas turbine emissions without suffering a loss in process efficiency.

BRIEF SUMMARY

Disclosed herein are systems and processes for reducing harmful emissions in a power generation system. In one embodiment, a system for reducing NO$_x$ emissions, includes a reformer configured to receive a fuel and produce a hydrogen-enriched stream, a combustion system configured to burn the hydrogen enriched-stream and produce electricity and an exhaust stream, and a recuperator configured to recover heat from the exhaust stream, wherein the recovered heat is recycled back to the reformer.

In another embodiment, a system for reducing NO$_x$ emissions, includes a reformer configured to receive a fuel and produce a hydrogen-enriched stream, wherein the hydrogen-enriched stream comprises carbon monoxide, carbon dioxide, hydrogen, and the fuel, a separation unit in fluid communication with the reformer, wherein the separation unit is configured to receive the hydrogen-enriched stream to separate the carbon dioxide from the hydrogen-enriched stream and produce a carbon dioxide-rich stream, a combustion system in fluid communication with the reformer and the separation unit including a combustor comprising a first stage and a second stage configured to receive the hydrogen-enriched stream and the carbon dioxide-rich stream, wherein the hydrogen-enriched stream is combusted in the first stage and the carbon dioxide-rich stream is combusted in the second stage, and wherein the combustor produces heat energy and a hot compressed mixed gas stream, and a gas turbine generator in fluid communication with the combustor, wherein the gas turbine generator is configured to expand the hot compressed mixed gas stream and produce electrical energy and an exhaust stream, and a recuperator in fluid communication with the combustion system configured to recover heat energy from the combustor and the exhaust stream, wherein the recovered heat is recycled back to the reformer.

A process for reducing NO$_x$ emissions, includes reforming with a reformer a fuel to produce a hydrogen enriched stream, wherein the hydrogen-enriched stream comprises carbon monoxide, carbon dioxide, hydrogen, and the fuel, separating the carbon dioxide from the hydrogen-enriched stream with a separation unit to produce a carbon dioxide-rich stream, combusting in a first stage of a combustor the hydrogen-enriched stream, combusting in a second stage of the combustor the carbon dioxide-rich stream, wherein combusting in the first stage and the second stage produces heat energy and a hot compressed mixed gas stream, expanding the hot compressed mixed gas stream to produce electricity and an exhaust stream, recovering the heat energy from the combustor and exhaust stream and recycling the recovered heat energy to the reformer.

The above described and other features are exemplified by the following figures and detailed description.

BRIEF DESCRIPTION OF THE DRAWINGS

Refer now to the figures, which are exemplary embodiments, and wherein like elements are numbered alike.

DETAILED DESCRIPTION OF THE PREFERRED EMBODIMENTS

Improved power generation systems and methods for reducing nitrogen oxides ($NO_x$) emissions in simple cycle gas turbines are disclosed herein. In contrast to prior art power generation systems, the systems disclosed herein use hydrogen-enriched fuel with low hydrogen concentration to reduce flame temperature in a combustor, and capture and recycle the energy from a combustion exhaust stream to increase process efficiency and reduce reforming costs. Moreover, the disclosed systems are capable of being retrofitted to existing power generation systems to provide the same reduced reforming costs and improved efficiencies. The terminology used herein is for the purpose of description, not limitation. Specific structural and functional details disclosed herein are not to be interpreted as limiting, but merely as a basis for the claims and a representative source for teaching one skilled in the art to variously employ the invention. Furthermore, as used herein, the terms "first", "second", and the like do not denote any order or importance, but rather are used to distinguish one element from another, and the terms "the", "a", and "an" do not denote limitation of quantity, but rather denote the presence of at least one of the referenced item. Additionally, all ranges directed to the same quantity of a given component or measurement is inclusive of the endpoints and independently combinable.

Figure 1:
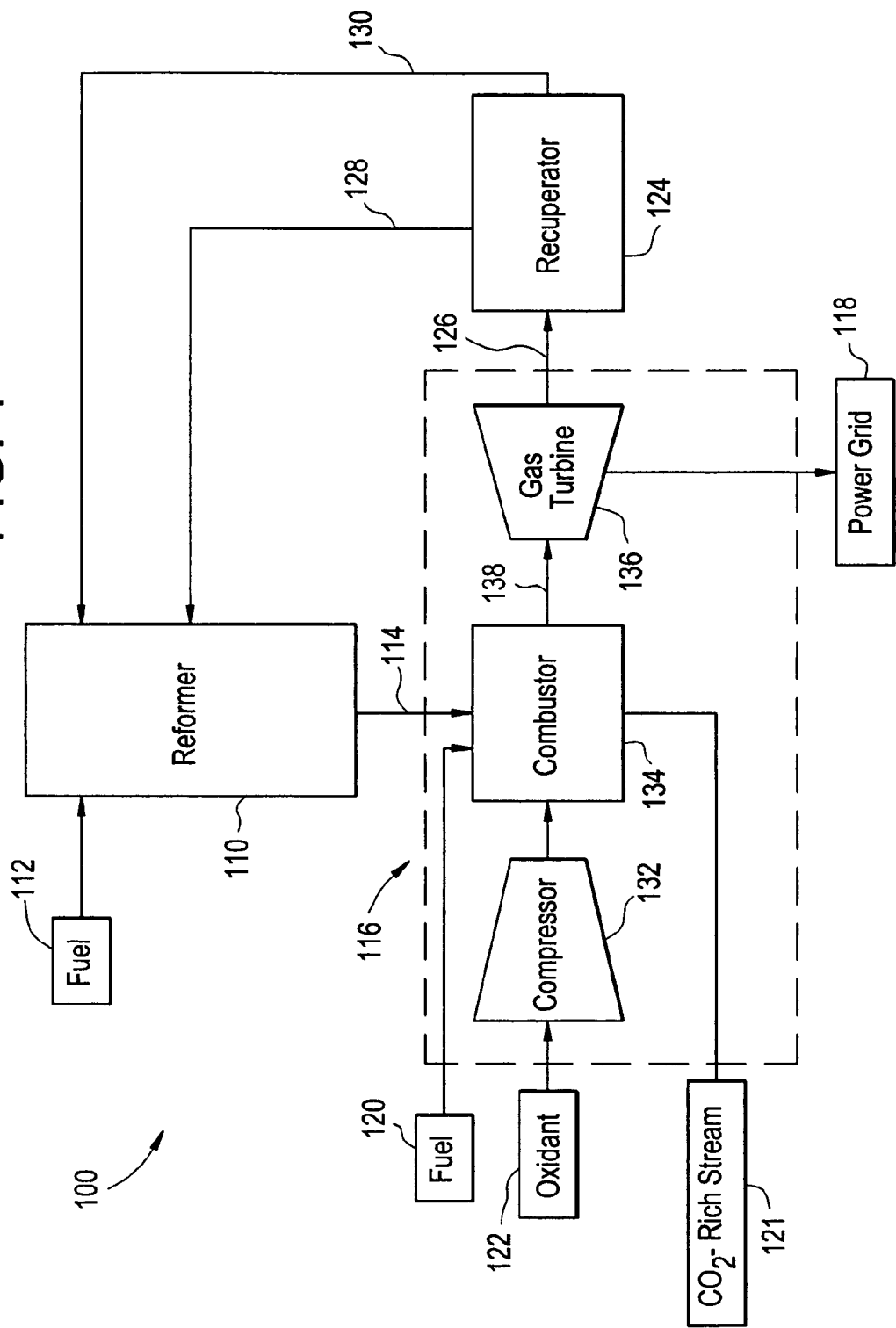
FIG. 1 illustrates a schematic process flow diagram of a first exemplary power generation system.

Turning now to FIG. 1, an exemplary simple cycle power system 100, is illustrated. The system 100 comprises a reformer 110 configured to reform a fuel 112 to produce a hydrogen-enriched stream 114. The hydrogen-enriched stream 114 is mixed with a supplemental fuel 120 and an oxidant 122 and introduced and burned in a combustion system 116 to produce power, e.g., electricity, that can be connected to a power grid 118.

The system 100 generates power while reducing $NO_x$ pollutants through the use of the hydrogen-enriched stream 114 having a low concentration of hydrogen. The hydrogen-enriched fuel lowers the flame temperature of the combustion system 116 compared to the use of fuel, e.g. natural gas, alone. As previously discussed, the flame temperature herein is a function of the equivalence ratio, which equivalence ratio is a measure of the fuel-to-oxidant ratio in the combustion system. At an equivalence ratio of 1.0, stoichiometric conditions are reached and the flame temperature is highest. It is at these high flame temperatures when the most $NO_x$ is typically generated. At equivalence ratios less than 1.0, the combustion system 116 is in "lean" condition and $NO_x$ production decreases rapidly. A combustion system can operate under lean conditions by reducing fuel flow or increasing oxidant flow, however, the window of operability under these conditions is limited and problems of flame blow out can occur. Moreover, if the flame temperature is too low, excessive carbon monoxide and unburned hydrocarbons can result. By doping the fuel with hydrogen gas, a larger operability window is possible because of hydrogen's lower flammability limit. Additionally, adding the hydrogen-enriched stream 114 to the combustion system 116 advantageously maintains a stable fuel supply while minimizing pollutant production, as opposed to trying to control emissions through oscillation in fuel supply, which can result in physical damage to the combustion system.

Figure 2:
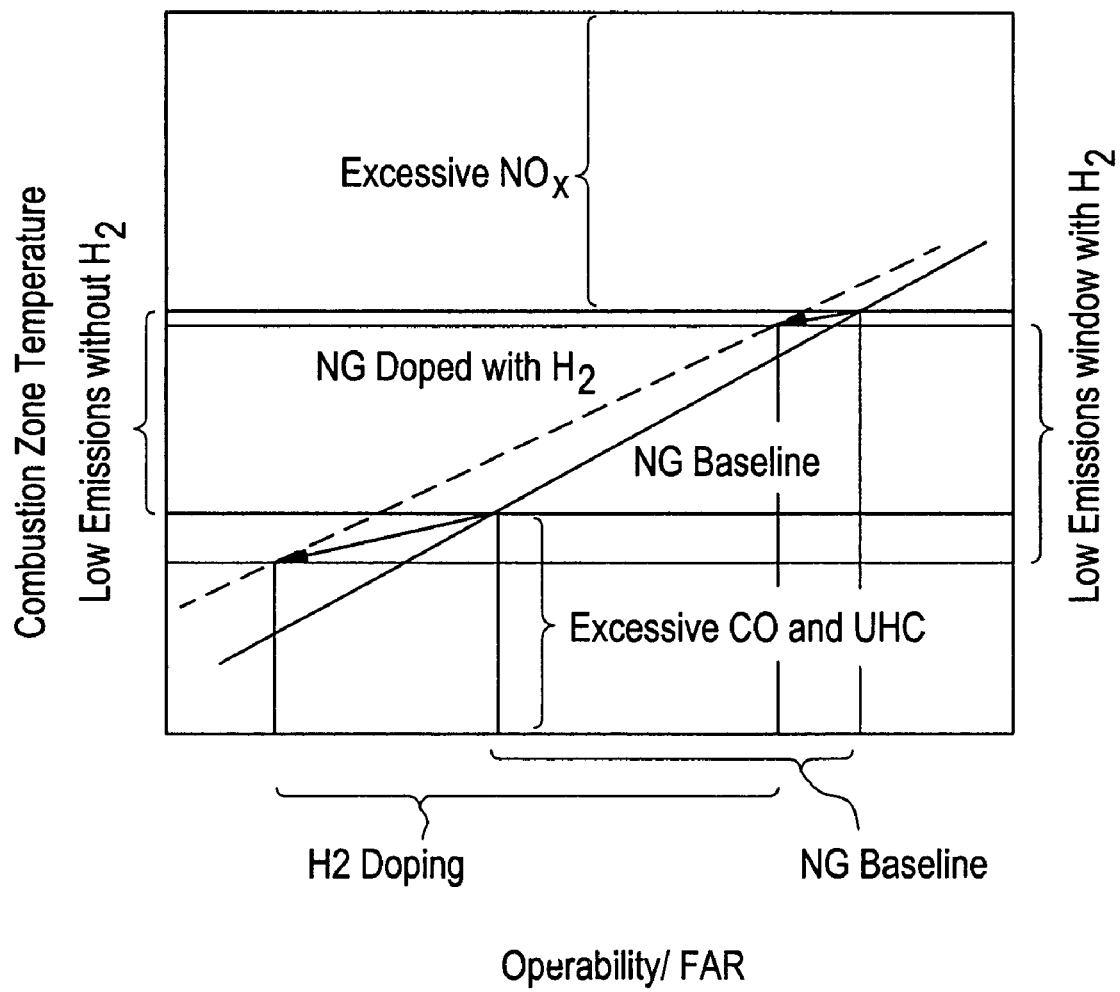
FIG. 2 graphically illustrates the variation of emissions and operability with the fuel-to-air ratio in the combustion zone temperature and operability of a combustor using hydrogen-enriched fuel.

FIG. 2 shows a graphical representation of the improved operability window for reduced $NO_x$ emissions by using hydrogen-enriched fuel versus fuel, e.g. natural gas, alone. By doping natural gas with hydrogen, a greater operability window for generating power and simultaneously maintaining low emissions is created. To achieve this improved operability window, only a low concentration of hydrogen is required. Preferably less than about 10 volume (vol.) percent and more preferably about 1 vol. percent to about 3 vol. percent, hydrogen is needed in the fuel. While such a concentration reduces harmful emissions and improves combustor performance, the low concentration of hydrogen also means reduced reformation costs over systems employing high to substantially pure concentrations of hydrogen. As will be discussed in more detail below, reformers such as catalytic partial oxidation (CPO) reformers may be employed because such reformation generates a reformate with relatively low hydrogen to carbon monoxide ratios.

Referring back to FIG. 1, the system 100 further comprises a recuperator 124. The recuperator 124 advantageously converts the heat from the exhaust stream 126, which would otherwise be lost in this simple cycle system, to recycle heat 128 back to the reformer 110. Optionally, the recuperator 124 can further generate steam 130 from the exhaust stream 126 for reforming the fuel 112. The recuperator 124 beneficially converts what would otherwise be heat lost from the combustion system 116 to energy used by the reformer 110. The recycling improves overall process efficiency while further reducing the operational costs of the reformer 110.

Figure 4:
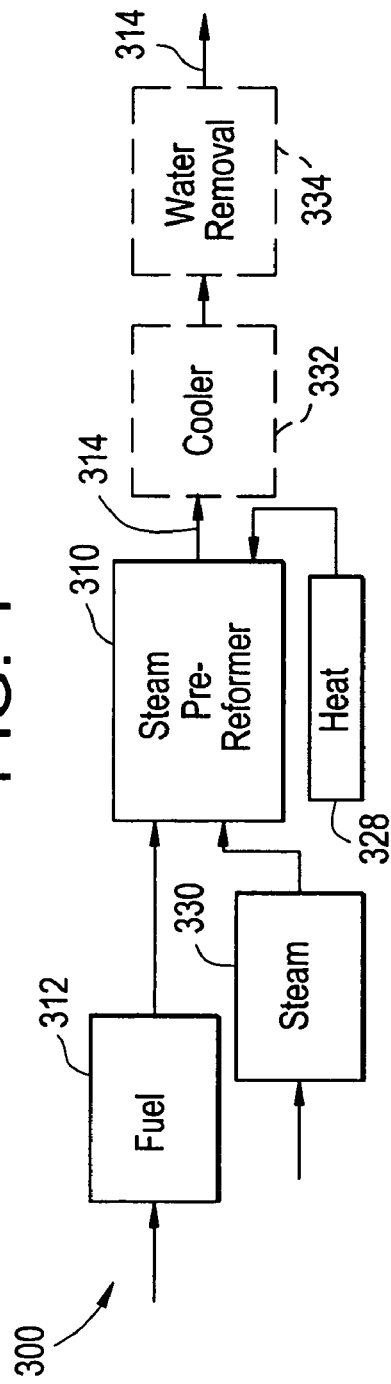
FIG. 4 illustrates a schematic process flow diagram of another exemplary reformer system.
Figure 5:
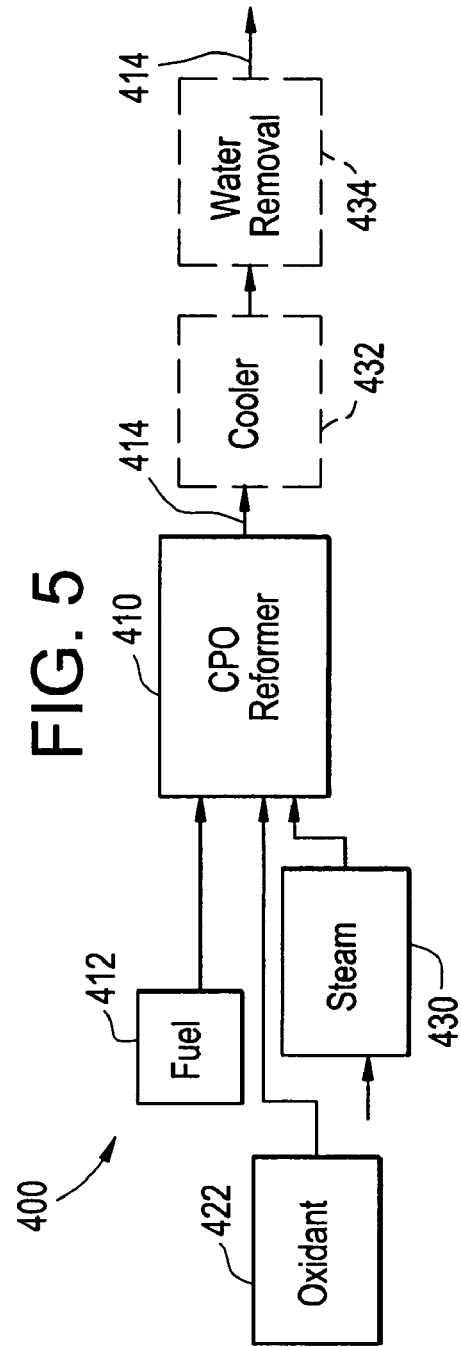
FIG. 5 illustrates a schematic process flow diagram of yet another exemplary reformer system.

The reformer 110 may be any reformer suitable for producing a hydrogen-enriched fuel stream. FIGS. 4 and 5 illustrate two exemplary reforming systems 300 and 400. Reformer system 300 of FIG. 4 comprises a steam pre-reformer 310. The combination of fuel 312 with heat 328 and steam 330, both of which can be recycled from the recuperator (not shown), promotes the reformation of fuel, e.g., natural gas, as shown in the reactions 1 and 2 below.

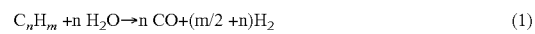

$$C_nH_m + n\ H_2O \rightarrow n\ CO + (m/2 + n)H_2 \quad (1)$$

$$CO + H_2O \rightarrow CO_2 + H_2 \quad (2)$$

The reforming reaction 1 takes place in the presence of a suitable steam reforming catalyst, such as nickel. The reforming reaction 1 is highly endothermic; therefore, the heat stream 328 from the recuperator is recycled back to the pre-reformer 310 to supply heat for the reaction. The reforming process leads to the formation of a reformed gas (also commonly known as syngas), which is designated as the hydrogen-enriched stream 314. The hydrogen-enriched stream 314 comprises carbon monoxide (CO), carbon dioxide ($CO_2$), hydrogen ($H_2$), unutilized fuel, and water. The hydrogen-enriched stream 314 may optionally be pre-treated before entering the combustion system (not shown). A cooler 332 and water removal step 334, designated as optional components of the reformer system 300 by dashed lines, may be used to cool and remove water from the hydrogen-enriched stream 314.

FIG. 5 illustrates a second exemplary embodiment of a reformer system 400. The reformer system 400 comprises a catalytic partial oxidation (CPO) reformer 410, rather than the steam pre-reformer of system 300. For CPO reformation, an oxidant 422 is used in conjunction with a fuel 412 and steam 430 to form the hydrogen-enriched stream 414. CPO reforming occurs in two reaction steps 3 and 4 as shown below.

$$C_nH_m + n/2 O_2 \rightarrow nCO + m/2 H_2 \qquad (3)$$

$$C_nH_m + nH_2O \rightarrow nCO + (m/2 + n)H_2 \qquad (4)$$

The reaction 3 is exothermic, while the reaction 4 is endothermic. The fuel 412 is mixed with the oxidant 422 and is simultaneously partially oxidized in reaction 3 and steam reformed in reaction 4. Optionally, more hydrogen and $CO_2$ can be created by continuing the reformation through a third reaction 5, below.

$$CO + H_2O \leftrightarrow H_2 + CO_2 \qquad (5)$$

The reaction 5 is known as a water-gas-shift reaction and is done in the presence of a catalyst. The $CO_2$ produced by this reaction may be advantageously separated and used in the combustion system (not shown), as will be described in greater detail below. Like the steam reforming system 300 above, the CPO reforming system 400 may also include a cooler 432 and water removal step 434, designated as optional components of the reformer system 400 by dashed lines, to cool and remove water from the hydrogen-enriched stream 414.

In operation, the reformers are optimized to produce a hydrogen-enriched stream having a hydrogen concentration of less than about 10 (wt/vol) percent. At this low concentration, the disclosed power generation system is able to operate at a reduced cost over systems using high concentration, or even pure, hydrogen feed streams in their combustors. By using a low concentration of hydrogen in the fuel, reformer operational costs are reduced and expensive separation equipment for further increasing hydrogen concentration are unnecessary.

Referring again back to FIG. 1, the hydrogen-enriched stream 114 enters the combustion system 116. The combustion system 116 may further comprise a compressor 132, a combustor 134, and a gas turbine generator 136. The hydrogen-enriched stream 114, entering the combustor 134 of the combustion system 116, may not be sufficiently hot and pressurized to power the gas turbine 136; therefore, the stream 114 may be augmented with supplemental fuel 120 and oxidant 122. After adding the additional fuel 120 and oxidant 122 to the combustor 134, the mixed gas stream 138 is sufficiently hot and pressurized to effectively power the gas turbine generator 136, therein resulting in the efficient production of electricity, sent to the power grid 118, and a hot exhaust stream 126 recovered by the recuperator 124.

The fuels 112 and 120 may comprise any suitable gas or liquid, such as for example, natural gas, methane, naphtha, butane, propane, diesel, kerosene, an aviation fuel, a coal-derived fuel, a bio-fuel, an oxygenated hydrocarbon feedstock, and mixtures comprising one or more of the foregoing fuels. In some embodiments, the fuel may preferably comprise natural gas. The oxidant 122 may comprise any suitable gas containing oxygen, such as for example, air, oxygen-rich air, oxygen-depleted air, pure oxygen, and the like. As stated above, the hydrogen-enriched stream 114 may comprise carbon monoxide, carbon dioxide, hydrogen, unutilized fuel, and water. For the system as disclosed herein, the hydrogen-enriched stream preferably has less than about 10 wt/vol percent hydrogen, and even more preferably about 1 wt/vol percent to about 3 wt/vol percent. The amount of hydrogen in the stream 114 is just enough to increase the operability window of flame temperature, as shown in FIG. 2. Increased concentrations of hydrogen result in increased equipment and operational costs, as well as possibly having the adverse effect of increasing $NO_x$ emissions in the system.

In operation, the compressed oxidant 122 is delivered to the combustor 134, mixed with the supplemental fuel 120 and the hydrogen-enriched stream 114, and ignited. In some embodiments, the burners in the combustor 134 may utilize premixed mixtures of fuel 114 and 120 and oxidant 122 and may comprise premixed swirling flow systems or non-swirling flow systems. Radial, axial, and/or double counter-rotating swirlers may also be utilized. The combustor 134 produces heat energy and hot compressed mixed gases 138, which are sent to the gas turbine generator 136. The compressed mixed gases 138 are expanded to drive the turbine, and are subsequently discharged as the exhaust stream 126 to the recuperator 124. Rotation of the turbine by the expanded high pressure mixed gases may be converted to electrical energy by means of a generator of the gas turbine generator 136 in a manner generally known to those skilled in the art. The electrical energy may then be sent to the power grid 118.

Optionally, the combustor 134 may have multiple stages of operation. In a first stage, the hydrogen-enriched stream 114 may be injected into the combustor 134. As stated above, the hydrogen rich fuel reduces the flame temperature while increasing the lean blow out margin. The combustor is therefore able to operate at a reduced temperature, thus lowering $NO_x$ emissions, without suffering from operability issues, such as flame blow out. In a second stage, a $CO_2$ rich stream 121 may be injected into the combustor after injection off the hydrogen-enriched stream 114. The $CO_2$ rich stream 121 is injected to premix the hydrogen-enriched fuel in the second stage in air and further reduce flame temperature. By using a $CO_2$ rich stream in the combustor, the high pressure potential of the stream can be exploited by expanding the gas over the turbine to generate power. As described, staging the hydrogen-enriched fuel stream within the combustor reduces $NO_x$ emissions by further reducing flame temperatures.

This optional $CO_2$-rich stream 121 may be produced by means of a second reformer operating at a different temperature regime than the reformer system 300, to produce a $CO_2$-rich fuel stream in a manner known to those skilled in the art. Alternatively, using the reformer system 400, the $CO_2$ may be separated after occurrence of the water-gas-shift reaction 5 with a separation device of a separation unit (not shown). The $CO_2$ separation unit may apply various techniques known in the art including, but not limited to, pressure swing adsorptions, chemical absorptions, and membrane separation to separate $CO_2$ from the hydrogen-enriched stream.

Pressure swing adsorption (PSA) may be used for separation of carbon dioxide from a mixture of gases containing hydrogen. In PSA techniques, at a high partial pressure, solid molecular sieves can adsorb carbon dioxide more strongly than hydrogen. As a result, at elevated pressures, carbon dioxide is removed from the mixture of gases comprising hydrogen when this mixture is passed through an adsorption bed. Regeneration of the bed is accomplished by depressurization and purging. Typically for critical operations, a plurality of adsorption vessels are used for continuous separation of carbon dioxide, wherein one adsorption bed is used while the others are regenerated.

Another technique for separation of carbon dioxide from a gas stream is chemical absorption using oxides, such as, calcium oxide (CaO) and magnesium oxide (MgO) or a combination thereof. In one embodiment, at elevated pressure and temperature, $CO_2$ is absorbed by CaO forming calcium carbonate ($CaCO_3$), thereby removing $CO_2$ from the gas mixture. The sorbent CaO is regenerated by calcinations of $CaCO_3$, which can again reform $CaCO_3$ to CaO.

Membrane separation technology may also be used for separation of carbon dioxide from a gas stream. Membrane processes are generally more energy efficient and easier to operate than absorption processes. The membranes used for high temperature carbon dioxide separation include zeolite and ceramic membranes, which are selective to $CO_2$. However, the separation efficiency of membrane technologies is low, and complete separation of carbon dioxide may not be achieved through membrane separation. Typically membrane separators work more efficiently at higher pressures, and use of a membrane separator to separate the carbon dioxide from the exit stream 60 from the shift reactor 56 may be achieved by further compression of the exit stream 60 prior to the separation of $CO_2$.

Yet another technique used for separation of $CO_2$ from the hydrogen-enriched stream 114 may include, but is not limited to, chemical absorption of $CO_2$ using amines. The hydrogen-enriched stream 114 may be cooled to a suitable temperature to use chemical absorption of carbon dioxide using amines. This technique is based on alkanol amines solvents that have the ability to absorb carbon dioxide at relatively low temperatures, and are easily regenerated by raising the temperature of the rich solvents. A carbon dioxide rich stream is obtained after regeneration of the rich solvent. The solvents used in this technique may include triethanolamine, monoethanolamine, diethanolamine, diisopropanolamine, diglycolamine, and methyldiethanolamine.

In some embodiments, the carbon dioxide separator may comprise at least one adsorption bed where a PSA technique is used to separate the carbon dioxide from the hydrogen-enriched stream 114. In some other embodiments, the carbon dioxide separator may comprise at least one absorption vessel, where a chemical absorption technique is used. In yet another embodiment the carbon dioxide separator comprises at least one membrane separator. Using the various techniques described herein, a carbon dioxide rich stream may be generated from the separation device.

By feeding a hydrogen-enriched fuel, and an optional $CO_2$-rich stream, to the combustor, the environmental pollutants, particularly $NO_x$ emissions, can be reduced from about 9 parts per million (ppm) to about 3 ppm or less. This enables current power generation systems to meet increasingly stringent EPA emissions standards. In prior art power systems, additional equipment is required for further treatment of the combustion exhaust gases in order to meet emissions standards, such as selective catalytic reduction (SCR) systems, $NO_x$ traps, and the like. Not only is such equipment costly, but it also requires additional space, which can be limited for existing power systems. Because the system disclosed herein advantageously reduces emissions within the combustor, the only additional feature required for such existing power systems is the recuperator, which requires less space and investment over the above described post-combustion treatment devices. Moreover, the recuperator advantageously recovers the heat otherwise lost from the combustion system and reduces reformer system operational costs as a result.

The recuperator 124 can be a known type of heat exchanger, whereby the heat energy from the combustor and exhaust stream 126 can be transferred to, for example, a compressed air stream, without mixing the two streams. By heating the compressed air stream with the exhaust stream 126, the cost of conventional heaters or regenerative heaters to raise the temperature of the reformer 110 is avoided, and in turn, the exhaust stream 126 is cooled before being discharged into the atmosphere. Optionally, the heat energy of the combustion system 116 may further heat an incoming water stream to produce steam 130, which can then be recycled to the reformer 110.

Figure 3:
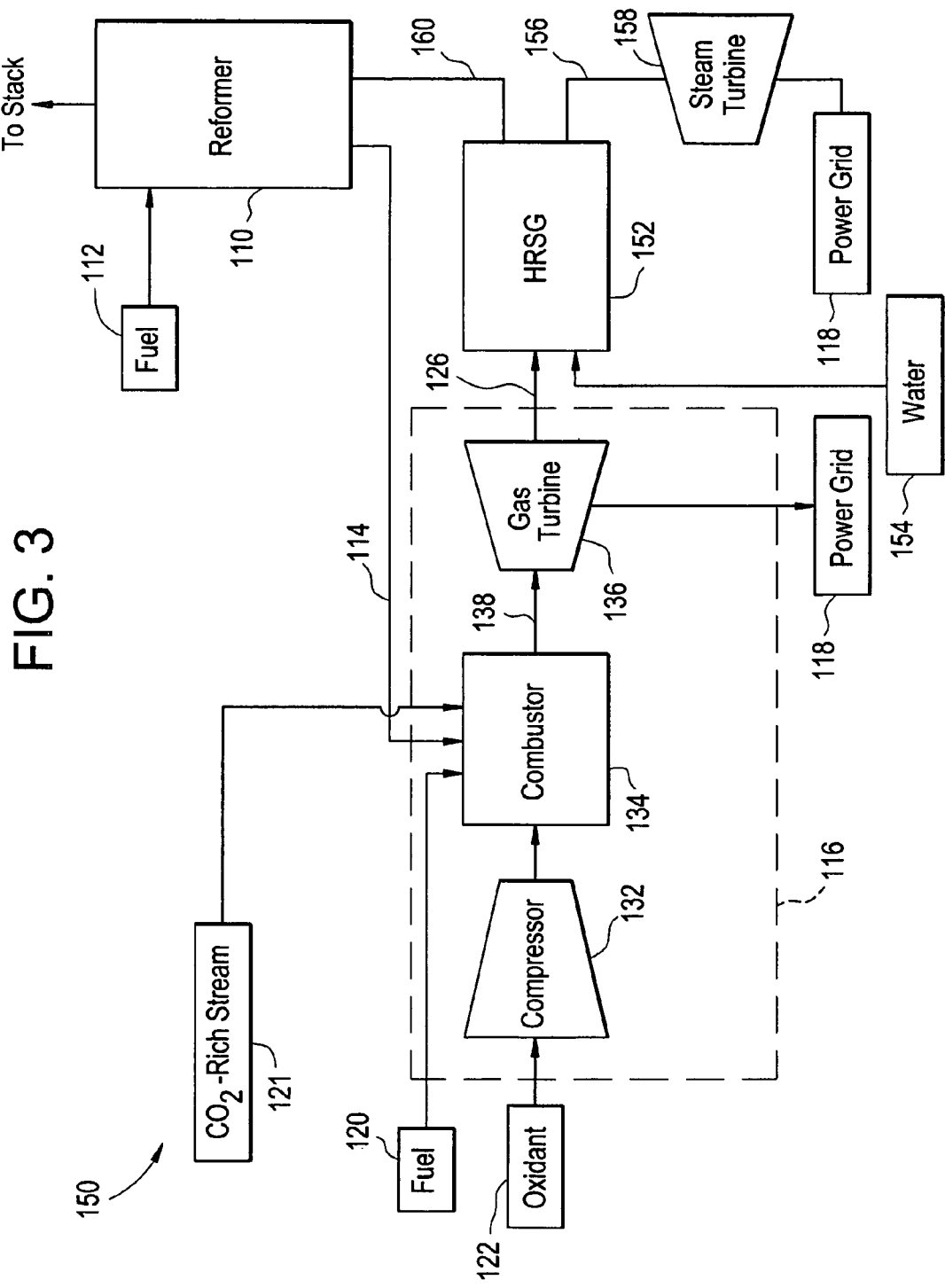
FIG. 3 illustrates a schematic process flow diagram of an exemplary reformer system.

In FIG. 3, a combined cycle system 150 is illustrated having a heat recovery steam generator (HRSG) 152 in place of the recuperator 124 in the simple cycle system 100. The HRSG 152 utilizes the waste heat from the exhaust gas 126 of the gas turbine 136 to generate a steam 156 and provide heat for the reformer 110. Water 154 is passed through the HRSG 152. The high grade heat from the gas turbine exhaust 126 is transferred to the water to form the steam 156 and a low-grade heat 160. A portion of the steam 156 is sent to a steam turbine 158, where the steam is expanded and cooled, thereby generating mechanical power. The mechanical power is subsequently converted to electrical power by a generator and sent to the power grid 118. Optionally, the expanded, cooled steam can exit the steam turbine 158 and be further cooled and condensed in a condenser to form the water 154 for the HRSG 152, thereby forming a recycle loop and increasing overall system efficiency.

The remaining low-grade heat 160 of the gas turbine exhaust 126 is sent to the low-temperature isothermal reformer 110, which utilizes the low-grade heat 160 to drive the endothermic reformation reaction and reform the fuel 112. The low-grade heat 160 is extracted by the reformer 110 and the resulting cooled exhaust gas is sent to a chimney stack for venting into the atmosphere.

To reiterate, as disclosed herein the above noted systems and processes incorporate the use of low concentration hydrogen-enriched fuel in the combustion system with a recuperator to recycle the low-grade gas turbine exhaust heat to the reformer; thereby enhancing the lean blowout margin, reducing harmful emissions, and increasing system efficiency, all while reducing operational costs. The reformer is advantageously configured to be isothermal and operate at low-temperatures, thereby being capable of utilizing the low-grade heat of the gas turbine exhaust to reform the fuel and produce a hydrogen-enriched fuel. The above system can also be advantageously retrofitted to an existing power generation system in order to comply with changing environmental emissions standards.

While the invention has been described with reference to an exemplary embodiment, it will be understood by those skilled in the art that various changes maybe be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for reducing NOx emissions, comprising:
 a reformer configured to receive a fuel and produce a hydrogen-enriched stream, wherein the hydrogen-enriched stream comprises about 1 volume percent to about 3 volume percent hydrogen;
a combustion system configured to burn the hydrogen-enriched stream and produce electricity and an exhaust stream; and
a recuperator configured to recover heat from the exhaust stream, wherein the recovered heat is recycled back to the reformer.

2. The system of claim 1, wherein the hydrogen-enriched stream increases an operability window of the combustion system.

3. The system of claim 1, wherein the recovered heat from the exhaust stream is used to generate a steam.

4. The system of claim 1, wherein the reformer is a steam pre-reformer.

5. The system of claim 1, wherein the reformer is a catalytic partial oxidation reformer.

6. The system of claim 1, wherein the NOx emissions are reduced from about 9 parts per million to less than or equal to about 3 parts per million.

7. A system for reducing NOx emissions, comprising:
a reformer configured to receive a fuel and produce a hydrogen-enriched stream, wherein the hydrogen-enriched stream comprises carbon monoxide, carbon dioxide, the fuel, and less than or equal to about 10 volume percent hydrogen;
a separation unit in fluid communication with the reformer, wherein the separation unit is configured to receive the hydrogen-enriched stream to separate the carbon dioxide from the hydrogen-enriched stream and produce a carbon dioxide-rich stream;
a combustion system in fluid communication with the reformer and the separation unit comprising:
a combustor comprising a first stage and a second stage configured to receive the hydrogen-enriched stream and the carbon dioxide-rich stream, wherein the hydrogen-enriched stream is combusted in the first stage and the carbon dioxide-rich stream is injected in the second stage where the hydrogen-enriched stream is further combusted, and wherein the combustor produces heat energy and a hot compressed mixed gas stream; and
a gas turbine generator in fluid communication with the combustor, wherein the gas turbine generator is configured to expand the hot compressed mixed gas stream and produce electrical energy and an exhaust stream; and
a recuperator in fluid communication with the combustion system configured to recover the heat energy from the combustor and the exhaust stream, wherein the recovered heat is recycled back to the reformer.

8. The system of claim 7, wherein the hydrogen-enriched stream comprises about 1 volume percent to about 3 volume percent hydrogen.

9. The system of claim 7, wherein the hydrogen-enriched stream increases an operability window of the combustion system.

10. The system of claim 7, wherein the recovered heat from the exhaust stream is used to generate a steam.

11. The system of claim 7, wherein the reformer is a steam pre-reformer.

12. The system of claim 7, wherein the reformer is a catalytic partial oxidation reformer.

13. The system of claim 7, wherein the NOx emissions are reduced from about 9 parts per million to less than or equal to about 3 parts per million.

14. The system of claim 7, wherein the separation unit further comprises a separation device selected from the group consisting of a pressure swing adsorber, a chemical absorber, a membrane separator, a cryogenic separator, and a water gas shift reactor.

15. A process for reducing NOx emissions, comprising:
reforming with a reformer a fuel to produce a hydrogen enriched stream, wherein the hydrogen-enriched stream comprises carbon monoxide, carbon dioxide, the fuel, and less than or equal to about 10 volume percent hydrogen;
separating the carbon dioxide from the hydrogen-enriched stream with a separation unit to produce a carbon dioxide-rich stream;
combusting in a first stage of a combustor the hydrogen-enriched stream;
injecting in a second stage of the combustor the carbon dioxide-rich stream for further combusting of the hydrogen-enriched stream, wherein combusting in the first stage and the second stage produces heat energy and a hot compressed mixed gas stream;
expanding the hot compressed mixed gas stream to produce electricity and an exhaust stream;
recovering the heat energy from the combustor and exhaust stream; and
recycling the recovered heat energy to the reformer.

16. The process of claim 15, wherein the hydrogen-enriched stream comprises about 1 volume percent to about 3 volume percent hydrogen.

17. The process of claim 15, wherein the NOx emissions are reduced from about 9 parts per million to less than or equal to about 3 parts per million.

18. A system for reducing NOx emissions, comprising:
a reformer configured to receive a fuel and produce a hydrogen-enriched stream, wherein the hydrogen-enriched stream comprises less than or equal to about 10 volume percent hydrogen;
a combustion system configured to burn the hydrogen-enriched stream and produce electricity and an exhaust stream; and
a recuperator configured to recover heat from the exhaust stream, wherein the recovered heat is recycled back to the reformer; and
a second reformer configured to receive the fuel and produce a carbon dioxide-rich stream, wherein the carbon dioxide-rich stream is burned in the combustion system.

* * * * *